(No Model.)
J. J. HOPPES.
FEED WATER HEATER AND PURIFIER.
No. 412,886. Patented Oct. 15, 1889.
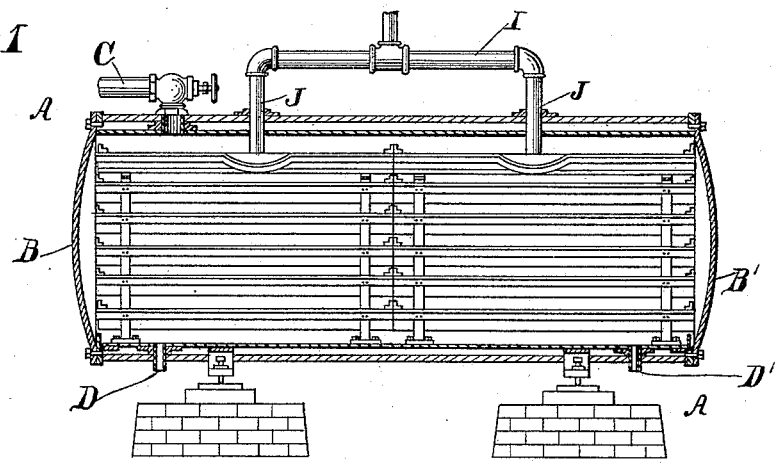
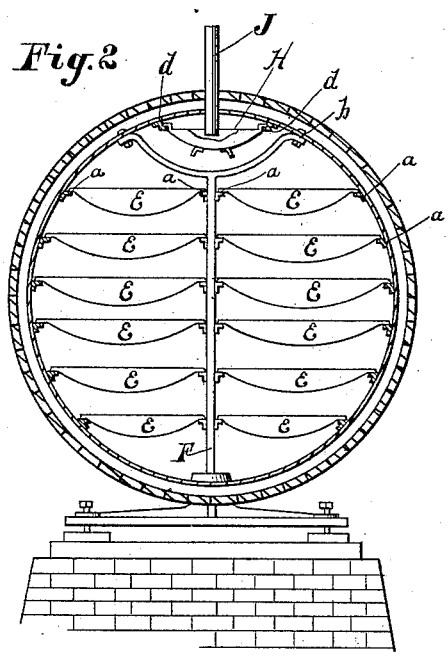
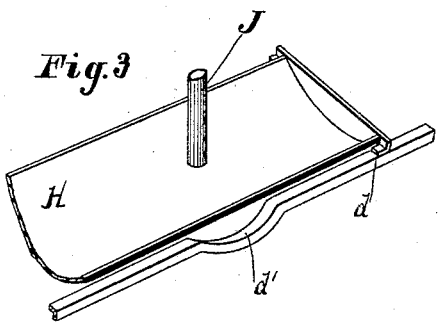
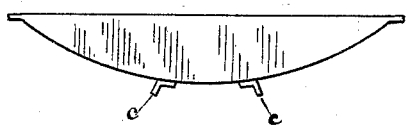
Witnesses
Chas. H. Bresnin
Chas. L. Welch.
Inventor
John J. Hoppes
By

UNITED STATES PATENT OFFICE.

JOHN J. HOPPES, OF SPRINGFIELD, OHIO, ASSIGNOR TO THE HOPPES MANUFACTURING COMPANY, OF SAME PLACE.

FEED-WATER HEATER AND PURIFIER.

SPECIFICATION forming part of Letters Patent No. 412,886, dated October 15, 1889.

Application filed July 10, 1889. Serial No. 317,036. (No model.)

*To all whom it may concern:*

Be it known that I, JOHN J. HOPPES, a citizen of the United States, residing at Springfield, in the county of Clark and State of Ohio, have invented certain new and useful Improvements in Feed-Water Heaters and Purifiers, of which the following is a specification.

My invention relates to purifiers for feed-water for steam-boilers; and it especially relates to that class of purifiers in which the incrustating substances and the free solids contained in the feed-water are extracted by passing through a series of pans and along the bottom thereof.

It also relates in its nature to improvements upon the construction set forth in my Letters Patent No. 318,112, of May 19, 1885.

The object of my invention is to provide a novel arrangement of the pans in order to economize space in the heater, and at the same time to furnish a construction adapted to increase the capacity of the heater without largely increasing the size of the pans, the construction being especially adapted for heaters of considerable size.

The further object of my invention is to provide novel means for feeding the water to the pans.

My invention consists in the constructions and combinations of parts hereinafter described, and set forth in the claims.

In the accompanying drawings, Figure 1 is a longitudinal sectional elevation of a heater embodying my invention. Fig. 2 is a transverse sectional view of the same. Fig. 3 is a perspective view of a portion of one of the pans and its supporting track or way, and showing the arrangement of the feed-pipe in connection with the upper pan. Fig. 4 is a transverse sectional view, enlarged, of the upper pan.

Like parts are represented by similar letters of reference in the several views.

In the said drawings, A A represent the outer casing, which is preferably of a cylindrical form and provided with removable heads B B′ at each end.

C is a steam-pipe, which is connected to the boiler.

D is an outlet-pipe, also connected to the boiler at the feed-supply.

D′ is a discharge-pipe, and may be provided with a suitable valve for discharging the water from the purifier for the purpose of cleaning.

E, &c., are pans, which are constructed substantially as set forth in my Letters Patent above referred to. In my present purifier I arrange these pans in double series throughout the length of the casing, one double series being preferably used in each end of the outer casing, making four series in all, all of the series being adapted to be withdrawn from the casing when either of the heads B B′ is removed. The pans E rest on suitable tracks or ways $a$, and are adapted to slide thereon to be removed from the outer casing. The tracks or ways for the inner ends of each series of pans are supported on Y-shaped supporting-standards F, which extend vertically through the center of the casing A, the branched or bifurcated portion being secured to the top of the casing, as shown at $b\ b$ in Fig. 2.

The water which passes through each double series of pans is fed to a single pan H, arranged centrally over the double series and above the branched portion of the supporting-standards F F. This pan H is provided with longitudinal projecting ribs or strips $c$, formed, preferably, of angle-iron, as shown in Figs. 2 and 4, secured to the bottom thereof, so as to stand over the respective pans of the double series.

The water to be purified is preferably fed to the pans H H over each double series from the supply-pipe I through the vertical branched portion J J. Now, in order that the water may be fed to the pan H as quietly as possible and to prevent steam entering the feed-pipe, it is desirable that the feed-pipes J J be extended into said pan below the water-line, so that the mouth of said pipe shall be covered by the water in said pan. It is necessary, also, that the ends of the pans be raised flush with or slightly above the edges of the pan in order that the water shall flow over the said edges and along the bottom of the pan where the incrustating substances are deposited, as set forth in my above-mentioned patent. In order, therefore, to provide for removing the top pans H, I form in the ways $d$, on which said pan is supported, a bent or curved portion $d'$, adapted to permit the end of the pan to drop at a point opposite the feed-pipe J, and thus pass under the end of said pipe, the pan being, in its normal position, raised up so as to stand level in said heater, the end of the feed-pipe being below the water-line therein when the pan is pushed to its normal position in the casing.

The operation of the heater as thus arranged is as follows: The water entering the pipe I passes in through the respective branches J J into the upper pans H of each double series. When the pan H is filled, the water passing over the edge thereof flows down along the bottom of the pan until it meets the rib or projection $c$, by which it is deflected and falls into the pan at the top of each series arranged underneath the same. As these pans are filled, the water passing over the edges and along the bottom fills the next succeeding pan, and thus to the bottom of the casing and out through the outlet-opening D. By this arrangement it will be seen that a heater of large capacity may be easily constructed without unduly increasing the size of the pans. One or more double series of pans may be used to secure the requisite amount of heating-surface on the pans.

The arrangement of the feed-pipes in connection with the upper pan and its curved supporting-ways forms an effective but economical feed device, and at the same time permits the pans to be readily withdrawn for cleaning or otherwise.

Having thus described my invention, I claim—

1. In a purifier, a double series of heating-pans, in combination with an upper pan having longitudinal ribs or projections adapted to deflect the water from the bottom of said pan into the respective series, substantially as specified.

2. The combination, with the double series of pans and an upper feeding-pan having the deflecting-strips, of the branched supporting-standards to support the inner ends of said standards and permit the upper pan to be removed, substantially as specified.

3. The combination, with a heating-pan and a feed-pipe adapted to extend below the water-line therein, of ways on which said pan is supported, said ways being provided with depressions opposite said feeding-pipe, substantially as and for the purpose set forth.

4. The combination, in a purifier, of an upper pan having a curved or inclined bottom and longitudinal edges over which the water is adapted to flow so as to pass along said bottom, and deflecting-strips on said bottom, substantially as specified.

5. The combination, with a feed-pan having a curved or inclined bottom and horizontal edges over which the water is adapted to flow so as to pass along said bottom, and a feed-pipe extending below the overflow-edges in said pan, of ways on which said pan is supported, said ways being provided with depressions opposite said feed-pipe to permit the end of said pan to pass under the feed-pipe when said pan is withdrawn, substantially as specified.

6. The combination, with the double series of heating-pans, of an upper pan having overflow-edges and a curved or inclined bottom with deflecting ribs or projections on the bottom of said pan, and a feed-pipe projecting into said pan below the overflow-edges, and the guides or ways having the depressions opposite said feed-pipe, substantially as specified.

7. The combination, with a double series of heating-pans, each provided with longitudinal overflow-edges and a curved or inclined bottom, of ways on which said pans are adapted to slide, an upper feeding-pan having deflecting projections in the bottom thereof to deflect the water into the respective series of said pans, and central supporting-standards to support the inner ways of each series of pans, said standards being branched to pass around the upper feeding-pan, substantially as specified.

8. In a purifier, a pan provided with overflow-edges and a feed-pipe projecting into said pan below said overflow-edges, and supporting-ways on which said pan is supported, said ways being provided with depressions opposite said feed-pipe to permit the end of the pan to drop down so as to pass under said pipe when withdrawn, substantially as specified.

9. The combination, with the main cylindrical casing, of two or more double series of feeding-pans in said casing, supporting-ways for said pans, central supporting-standards for said ways, an upper feed-pan for each series having overflow-edges and deflecting-strips, a feed-pipe having branched portions extending into the respective feed-pans below the overflow-edges thereof, and guides or ways on which said feed-pans are supported provided with depressions opposite the respective branches of said feed-pipe, substantially as specified.

In testimony whereof I have hereunto set my hand this 2d day of May, A. D. 1889.

JOHN J. HOPPES.

Witnesses:
CHAS. I. WELCH,
PAUL A. STALEY.